United States Patent
Du et al.

(10) Patent No.: US 12,488,247 B2
(45) Date of Patent: Dec. 2, 2025

(54) PROCESSING METHOD AND ACCELERATING DEVICE

(71) Applicant: Shanghai Cambricon Information Technology Co., Ltd., Pudong New Area (CN)

(72) Inventors: Zidong Du, Pudong New Area (CN); Xuda Zhou, Pudong New Area (CN); Zai Wang, Pudong New Area (CN); Tianshi Chen, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 1003 days.

(21) Appl. No.: 16/699,049

(22) Filed: Nov. 28, 2019

(65) Prior Publication Data

US 2020/0134460 A1    Apr. 30, 2020

Related U.S. Application Data

(63) Continuation of application No. 16/699,027, filed on Nov. 28, 2019, which is a continuation-in-part of (Continued)

(30) Foreign Application Priority Data

Aug. 9, 2017    (CN) .......................... 201710677987.4

(51) Int. Cl.
G06N 3/082    (2023.01)
G06F 1/3296    (2019.01)
(Continued)

(52) U.S. Cl.
CPC .......... *G06N 3/082* (2013.01); *G06F 1/3296* (2013.01); *G06F 9/3877* (2013.01);
(Continued)

(58) Field of Classification Search
CPC .......... G06N 3/082; G06N 3/04; G06N 3/044; G06N 3/048; G06N 3/063; G06N 3/084;
(Continued)

(56) References Cited

U.S. PATENT DOCUMENTS 4,422,141 A    12/1983    Shoji
6,360,019 B1    3/2002    Chaddha
(Continued)

FOREIGN PATENT DOCUMENTS

CN    105512723 A    4/2016
CN    106485316 A    3/2017
(Continued)

OTHER PUBLICATIONS

Kadetotad et al. ("Efficient Memory Compression in Deep Neural Networks Using Coarse-Grain Sparsification for Speech Applications", ICCAD, 2016) (Year: 2016).*
(Continued)

*Primary Examiner* — Imad Kassim
(74) *Attorney, Agent, or Firm* — Getech Law LLC; Jun Ye

(57) ABSTRACT

The present disclosure provides a processing device including: a coarse-grained pruning unit configured to perform coarse-grained pruning on a weight of a neural network to obtain a pruned weight, an operation unit configured to train the neural network according to the pruned weight. The coarse-grained pruning unit is specifically configured to select M weights from the weights of the neural network through a sliding window, and when the M weights meet a preset condition, all or part of the M weights may be set to 0. The processing device can reduce the memory access while reducing the amount of computation, thereby obtaining an acceleration ratio and reducing energy consumption.

16 Claims, 4 Drawing Sheets

Related U.S. Application Data application No. PCT/CN2018/088033, filed on May 23, 2018.

(51) Int. Cl.

| | |
|---|---|
| G06F 9/38 | (2018.01) |
| G06F 12/0875 | (2016.01) |
| G06F 13/16 | (2006.01) |
| G06F 16/28 | (2019.01) |
| G06N 3/04 | (2023.01) |
| G06N 3/044 | (2023.01) |
| G06N 3/048 | (2023.01) |
| G06N 3/063 | (2023.01) |
| G06N 3/084 | (2023.01) |

(52) U.S. Cl.
CPC .......... *G06F 12/0875* (2013.01); *G06F 13/16* (2013.01); *G06F 16/285* (2019.01); *G06N 3/04* (2013.01); *G06N 3/044* (2023.01); *G06N 3/048* (2023.01); *G06N 3/063* (2013.01); *G06N 3/084* (2013.01); *G06F 2212/452* (2013.01); *G06F 2213/0026* (2013.01)

(58) Field of Classification Search
CPC ..... G06N 3/045; G06F 1/3296; G06F 9/3877; G06F 12/0875; G06F 13/16; G06F 16/285; G06F 2212/452; G06F 2213/0026; G06F 12/0848; G06F 2212/1008; G06F 2212/1032; G06F 2212/1041; G06F 2212/454; G06F 18/23213; Y02D 10/00

See application file for complete search history.

(56) References Cited

U.S. PATENT DOCUMENTS

| | | | |
|---|---|---|---|
| 6,772,126 | B1 | 8/2004 | Simpson et al. |
| 10,127,495 | B1 | 11/2018 | Bopardikar et al. |
| 10,657,439 | B2 | 5/2020 | Liu et al. |
| 11,315,018 | B2 | 4/2022 | Molchanov et al. |
| 2003/0204311 | A1 | 10/2003 | Bush |
| 2004/0180690 | A1 | 9/2004 | Song et al. |
| 2005/0102301 | A1 | 5/2005 | Flanagan |
| 2008/0249767 | A1 | 10/2008 | Ertan |
| 2012/0189047 | A1 | 7/2012 | Jiang et al. |
| 2014/0300758 | A1 | 10/2014 | Tran |
| 2015/0332690 | A1* | 11/2015 | Kim .............. G10L 19/008 704/222 |
| 2016/0358069 | A1* | 12/2016 | Brothers .............. G06F 7/764 |
| 2017/0061328 | A1* | 3/2017 | Majumdar ............ G06N 3/08 |
| 2017/0270408 | A1 | 9/2017 | Shi et al. |
| 2018/0046900 | A1* | 2/2018 | Dally .............. G06F 9/30018 |
| 2018/0075336 | A1* | 3/2018 | Huang ................ G06N 3/045 |
| 2018/0114114 | A1 | 4/2018 | Molchanov et al. |
| 2018/0121796 | A1 | 5/2018 | Deisher et al. |
| 2018/0197081 | A1* | 7/2018 | Ji ........................ G06N 3/08 |
| 2018/0285731 | A1 | 10/2018 | Heifets et al. |
| 2018/0300603 | A1* | 10/2018 | Ambardekar ....... H03M 7/6005 |
| 2018/0314940 | A1 | 11/2018 | Kundu et al. |
| 2019/0019311 | A1 | 1/2019 | Hu et al. |
| 2019/0050709 | A1* | 2/2019 | Yang .................. G06N 3/088 |
| 2019/0362235 | A1 | 11/2019 | Xu et al. |
| 2020/0097806 | A1 | 3/2020 | Chen et al. |
| 2020/0097826 | A1 | 3/2020 | Du et al. |
| 2020/0097827 | A1 | 3/2020 | Wang et al. |
| 2020/0097828 | A1 | 3/2020 | Du et al. |
| 2020/0097831 | A1 | 3/2020 | Wang et al. |
| 2020/0265301 | A1* | 8/2020 | Burger ................ G06N 3/084 |
| 2021/0182077 | A1 | 6/2021 | Chen et al. |
| 2021/0224069 | A1 | 7/2021 | Chen et al. |

FOREIGN PATENT DOCUMENTS

| | | |
|---|---|---|
| CN | 106548234 A | 3/2017 |
| CN | 106919942 A | 7/2017 |
| CN | 106991477 A | 7/2017 |

OTHER PUBLICATIONS

Papandreou et al. ("Modeling Local and Global Deformations in Deep Learning: Epitomic Convolution, Multiple Instance Learning, and Sliding Window Detection", IEEE, 2015) (Year: 2015).*

Han et al. ("Deep compression: compressing deep neural networks with pruning, trained quantization and Huffman coding", ICLR 2016) (Year: 2016).*

Zeng Dan et al.: "Compressing Deep Neural Network for Facial Landmarks Detection", International Conference on Financial Cryptography and Data Security, Nov. 13, 2016, 11 Pages.

Song Han et al; "Deep Compression: Compressing Deep Neural Networks with Pruning, Trained Quantization and Huffman D2 Coding", Internet: URL:https://arxiv.org/pdf/1510.00149v5.pdf; Feb. 15, 2016; 14 pages.

Fujii Tomoya et al; "An FPGA Realization of a Deep Convolutional Neural Network Using a Threshold Neuron Pruning", International Conference on Financial Cryptography and Data Security; Mar. 31, 2017; 13 pages.

Sun Fangxuan et al.; "Intra-layer nonuniform quantization of convolutional neural network" 2016 8th International Conference on Wireless Communications & Signal Processing (WCSP), IEEE, Oct. 13, 2016, 5 pages.

Song Han et al.: "ESE: Efficient Speech Recognition Engine with Sparse LSTM on FPGA", Proceedings of the 2017 ACM/SIGDA International Symposium on Field-Programmable Gate Arrays; Feb. 17, 2017; 10 pages.

Sajid Anwar et al; "Structured Pruning of Deep Convolutional Neural Networks", ACM Journal on Emerging Technologies in Computing Systems; Feb. 9, 2017, 18 pages.

Yunchao Gong et al.; "Compressing Deep Convolutional Networks using Vector Quantization", Internet: URL:https://arxiv.org/pdf/1412.6115.pdf ; Dec. 18, 2014, 10 pages.

Kadetotad Deepak et al.; "Efficient memory compression in deep neural networks using coarse-grain sparsification for speech applications", 2016 IEEE/ACM International Conference on Computer-Aided Design, Nov. 7, 2016, 8 pages.

Song Han et al.; "Leraning both weights and connections for efficient neural networks" Published as a conference paper at NIPS 2015; Internet URL: https://arxiv.org/abs/1506.02626; Oct. 30, 2015; 9 pages.

EP 18806558.5, European Search Report mailed Apr. 24, 2020, 13 pages.

EP 19214007.7, European Search Report mailed Apr. 15, 2020, 12 pages.

EP 19214010.1, European Search Report mailed Apr. 21, 2020, 12 pages.

EP 19214015.0, European Search Report mailed Apr. 21, 2020, 14 pages.

Moons, Bert, et. al. "Energy-Efficient ConvNets Through Approximate Computing", arXiv:1603.06777v1, Mar. 22, 2016, 8 pages.

EP 19 214 010.1, Communication pursuant to Article 94(3), mailed Jan. 3, 2022, 11 pages.

Huang, Hongmei, et al, "Fault Prediction Method Based on RBF Network On-Line Learning", Journal of Nanjing University of Aeronautics & Astronautics, vol. 39 No. 2, Apr. 2007, 4 pages.

CN 201710370905.1—Second Office Action, mailed Mar. 18, 2021,11 pages. (with English translation).

CN 201710583336.9—First Office Action, mailed Apr. 23, 2020, 15 pages. (with English translation).

CN 201710677987.4—Third Office Action, mailed Mar. 30, 2021, 16 pages. (with English translation).

CN 201710678038.8—First Office Action, mailed Oct. 10, 2020, 12 pages. (with English translation).

CN 201710689666.6—First Office Action, mailed Jun. 23, 2020, 19 pages. (with English translation).

(56) References Cited

OTHER PUBLICATIONS

CN 201710689666.6—Second Office Action, mailed Feb. 3, 2021, 18 pages. (with English translation).
CN 201710689595.X—First Office Action, mailed Sep. 27, 2020, 21 pages. (with English translation).
Liu, Shaoli, et al., "Cambricon: An Instruction Set Architecture for Neural Networks", ACM/IEEE, 2016, 13 pages.
CN 201710689595.X—Second Office Action, mailed Jun. 6, 2021, 17 pages. (with English translation).
EP 18 806 558.5, Communication pursuant to Article 94(3), mailed Dec. 9, 2021, 11 pages.
EP 19 214 007.7, Communication pursuant to Article 94(3), mailed Dec. 8, 2021, 10 pages.
EP 19 214 015.0, Communication pursuant to Article 94(3), mailed Jan. 3, 2022, 12 pages.
PCT/CN2018/088033—Search Report, mailed Aug. 21, 2018, 19 pages. (with English translation).
Ahalt et al., "Competitive Learning Algorithms for Vector Quantization", Neural Networks, vol. 3, Issue 3, pp. 277-290, 1990.
Anwar et al. "Compact Deep Convolutional Neural Networks with Coarse Pruning", Department of Electrical Engineering and Computer Science Seoul National University, ICLR, Oct. 30, 2016, pp. 1-10.
Choi et al., "Towards the Limit of Network Quantization", ICLR 2017, Apr. 2017, pp. 1-14.
Chu et al., "Vector Quantization of Neural Networks", IEEE Transactions on Neural Networks, vol. 9, No. 6, Nov. 1998, pp. 1235-1245.
Han et al., "EIE: Efficient Inference Engine on Compressed Deep Neural Network", Available online at https://arxiv.org/pdf/1602.01528.pdf, May 3, 2016, 12 Pages.
He et al., "Effective Quantization Methods for Recurrent Neural Networks", Available online at https://arxiv.org/pdf/1611.10176.pdf, Nov. 30, 2016, pp. 1-10.
Judd et al., "Cnvlutin2: Ineffectual-Activation-and-Weight-free Deep Neural Network Computing", Available online at https://arxiv.org/pdf/1705.00125.pdf, Apr. 29, 2017, pp. 1-6.
Lane et al., "Squeezing Deep Learning into Mobile and Embedded Devices", IEEE Pervasive Computing, vol. 16, Issue 3, Jul. 27, 2017, pp. 82-88.
Mao et al., "Exploring the Granularity of Sparsity in Convolutional Neural Networks", 2017 IEEE Conference on Computer Vision and Pattern Recognition Workshops (CVPRW), Jul. 21-26, 2017, pp. 1927-1934.
Mao et al., "Exploring the Regularity of Sparse Structure in Convolutional Neural Networks", Available online at https://arxiv.org/pdf/1705.08922.pdf, May 24, 2017, pp. 1-10.
Parashar et al., "SCNN: An Accelerator for Compressed-sparse Convolutional Neural Networks", 2017 ACM/IEEE 44th Annual International Symposium on Computer Architecture (ISCA), Jun. 24-28, 2017, pp. 27-40.
U.S. Appl. No. 16/699,027—Non-Final Office Action mailed on Apr. 3, 2023, 22 pages.
U.S. Appl. No. 16/699,029—Non-Final Office Action mailed on Oct. 6, 2022, 15 pages.
U.S. Appl. No. 16/699,029—Notice of Allowance mailed on Mar. 14, 2023, 8 pages.
U.S. Appl. No. 16/699,032—Corrected Notice of Allowability mailed on Jan. 9, 2024, 2 pages.
U.S. Appl. No. 16/699,032—Non-Final Office Action mailed on Jul. 1, 2022, 15 pages.
U.S. Appl. No. 16/699,032—Notice of Allowance mailed on Oct. 25, 2023, 5 pages.
U.S. Appl. No. 16/699,046—Non-Final Office Action mailed on Sep. 22, 2022, 15 pages.
U.S. Appl. No. 16/699,046—Notice of Allowance mailed on Mar. 30, 2023, 9 pages.
U.S. Appl. No. 16/699,051—Final Office Action mailed on Feb. 15, 2024, 35 pages.
U.S. Appl. No. 16/699,051—Final Office Action mailed on Sep. 27, 2022, 36 pages.
U.S. Appl. No. 16/699,051—Non-Final Office Action mailed on Mar. 3, 2022, 32 pages.
U.S. Appl. No. 16/699,051—Non-Final Office Action mailed on May 8, 2023, 37 pages.
U.S. Appl. No. 16/699,055—Non-Final Office Action mailed on Jun. 8, 2023, 31 pages.
U.S. Appl. No. 62/486,432—Enhanced Neural Network Designs, filed Apr. 17, 2017, 69 pages.
Yang et al., "Designing Energy-Efficient Convolutional Neural Networks using Energy-Aware Pruning", 2017 IEEE Conference on Computer Vision and Pattern Recognition (CVPR), Jul. 21-26, 2017, pp. 6071-6079.
Yu et al., "Scalpel: Customizing DNN Pruning to the Underlying Hardware Parallelism", 2017 ACM/IEEE 44th Annual International Symposium on Computer Architecture (ISCA), Jun. 24-28, 2017, pp. 548-560.
Zhou et al., "Cambricon-S: Addressing Irregularity in Sparse Neural Networks through a Cooperative Software/Hardware Approach", 51st Annual IEEE/ACM International Symposium on Microarchitecture, Oct. 20, 2018, pp. 15-28.
U.S. Appl. No. 16/699,055—Final Office Action mailed on Apr. 11, 2024, 31 pages.
U.S. Appl. No. 16/699,051—Non-Final Office Action mailed on Sep. 9, 2024, 30 pages.
Lee et al., "Adaptive Vector Quantization Using a Self-development Neural Network", IEEE Journal on Selected Areas in Communications, vol. 8, No. 8, Oct. 1990, pp. 1458-1471.
U.S. Appl. No. 16/699,027—Final Office Action mailed on May 21, 2024, 17 pages.
EP19214007.7—Communication pursuant to Article 94(3) EPC mailed on Apr. 23, 2024, 7 pages.
EP18806558.5—Summons to attend oral proceedings mailed on Apr. 11, 2024, 13 pages.
EP19214015.0—Communication pursuant to Article 94(3) mailed on Jun. 28, 2024, 7 pages.
EP19214010.1—Communication pursuant to Article 94(3) mailed on Jun. 28, 2024, 4 pages.
U.S. Appl. No. 16/699,055—Non-Final Office Action mailed on Dec. 12, 2024, 33 pages.
U.S. Appl. No. 16/699,051—Final Office Action mailed on Jun. 11, 2025, 37 pages.
EP19214010.1—Communication pursuant to Article 94(3) EPC mailed on Dec. 9, 2024, 11 pages.

\* cited by examiner

PROCESSING METHOD AND ACCELERATING DEVICE

TECHNICAL FIELD

The disclosure relates to the field of computer, particularly to the field of artificial intelligence.

BACKGROUND

Neural networks have been successfully applied. However, as neural networks that are deeper and larger in scale have been designed, more weights would be introduced, and therefore super large-scale weight may become a huge challenge to neural network computation. On the one hand, large-scale weight data imposes a higher requirement on storage capacity, for example, the storage capacity of an embedded device such as a mobile phone is quite limited, so that it may be impossible to store all weight data. On the other hand, accessing weight many times will cause immeasurable access energy consumption. Therefore, how to compress the size of neural network becomes an urgent problem to be solved.

SUMMARY

(1) Technical Problems to be Solved

The disclosure is intended to provide a compression method and a compression device for neural network to solve at least one of the above-described technical problems.

(2) Technical Solutions

The present disclosure provides a data compression method including:
performing coarse-grained pruning on a weight of a neural network, which may include: selecting M weights from the neural network through a sliding window, setting all or part of the M weights to 0 when the M weights meet a preset condition, where the M is an positive integer greater than 0; performing a first retraining on the neural network, where the weight which has been set to 0 in the retraining process remains 0, and
quantizing the weight of the neural network, which may include: grouping the weights of the neural network; performing a clustering operation on each group of weights by using a clustering algorithm, computing a center weight of each class, and replacing all the weights in each class by the center weights.

Furthermore, after quantizing the weight of the neural network, the method may also include:
encoding the center weight to obtain a weight codebook and a weight dictionary.

Furthermore, after encoding the center weight, the method may also include:
performing a second retraining on the neural network.

Furthermore, only the weight codebook is trained during the second retraining of the neural network, and the weight dictionary remains unchanged.

Furthermore, the preset condition is:
the information quantity of the M weights is less than a first given threshold.

Furthermore, the information quantity of the M weights is an arithmetic mean of an absolute value of the M weights, a geometric mean of the absolute value of the M weights or a maximum value of the M weights; the first given threshold is a first threshold, a second threshold or a third threshold; and the information quantity of the M weights being less than the first given threshold may include:
the arithmetic mean of the absolute value of the M weights being less than the first threshold, or the geometric mean of the absolute value of the M weights being less than the second threshold, or the maximum value of the M weights being less than the third threshold.

Furthermore, the method may also include:
repeating selecting M weights from the neural network through the sliding window, setting all or part of the M weights to 0 when the M weights meet a preset condition; and performing the first retraining on the neural network until no weight can be set to 0 without losing a preset precision.

Furthermore, the preset precision is x %, where x is between 0 and 5.

Further, performing coarse-grained pruning on the weight of the neural network may include:
performing coarse-grained pruning on the weight of a fully connected layer of the neural network, or performing coarse-grained pruning on the weight of a convolutional layer of the neural network, or performing coarse-grained pruning on the weight of a LSTM layer of the neural network.

In an embodiment, the weight of the fully connected layer is a two-dimensional matrix (Nin, Nout), where Nin represents the count of input neurons and Nout represents the count of output neurons, and the fully connected layer has Nin*Nout weights; the size of the sliding window is Bin*Bout, where Bin is a positive integer greater than 0 and less than or equal to Nin, and Bout is a positive integer greater than 0 and less than or equal to Nout.

The performing coarse-grained pruning on the weight of the fully connected layer of the neural network may include:
making the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout; and
selecting M weights from the Nin*Nout weights through the sliding window, and when the M weights meet the preset condition, all or part of the M weights may be set to 0, where M=Bin*Bout.

Further, the weight of the convolutional layer of the neural network is a four-dimensional matrix (Nfin,Nfout,Kx,Ky), where Nfin represents the count of input feature maps, Nfout represents the count of output feature maps, (Kx,Ky) is the size of a convolution kernel, and the convolutional layer has Nfin*Nfout*Kx*Ky weights; the sliding window is a four-dimensional sliding window with the size of Bfin*Bfout*Bx*By, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky.

The performing coarse-grained pruning on the weight of the convolutional layer of the neural network may include:
making the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; and selecting M weights from the Nfin*Nfout*Kx*Ky weights through the sliding window, and when the M weights meet the preset condition, all or part of the M weights may be set to 0, where M=Bfin*Bfout*Bx*By.

Further, the weight of the LSTM layer is composed of m weights of the fully connected layer, where m is a positive integer greater than 0, and an $i^{th}$ weight of the fully connected layer is a two-dimensional matrix (Nin_i, Nout_i), where i is a positive integer greater than 0 and less than or equal to m, Nin_i represents the count of input neurons of the $i^{th}$ weight of the fully connected layer and Nout_i represents the count of output neurons of the $i^{th}$ weight of the fully connected layer; the size of the sliding window is Bin_i*Bout_i, Bin_i is a positive integer greater than 0 and less than or equal to Nin_i, and Bout_i is a positive integer greater than 0 and less than or equal to Nout_i.

Further, performing the coarse-grained pruning on the weight of the LSTM layer of the neural network may include:

making the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and selecting M weights from the Bin_i*Bout_i weights through the sliding window, and when the M weights meet the preset condition, all or part of the M weights may be set to 0, where M=Bin_i*Bout_i.

Furthermore, the first retraining adopts a back propagation algorithm, and the weight that has been set to 0 in the retraining process remains 0.

Furthermore, the grouping method of the weights of the neural network may include:

grouping the weights of the neural network into one group, and/or;

grouping the weights of the neural network according to the layer-type-based grouping method, and/or;

grouping the weights of the neural network by an inter-layer-based grouping method or an intra-layer-based grouping method.

Furthermore, grouping the weights of the neural network according to the layer-type-based grouping method may include:

grouping the weights of all convolutional layers, all fully connected layers and all LSTM layers in the neural network into one group respectively.

Furthermore, grouping the weights of the neural network by an inter-layer-based grouping method may include:

grouping the weights of one or a plurality of convolutional layers, one or a plurality of fully connected layers and one or a plurality of LSTM layers in the neural network into one group respectively.

Furthermore, grouping the weights of the neural network by an intra-layer-based grouping method may include:

segmenting the weights in one layer of the neural network, where each segmented part forms a group.

Furthermore, the clustering algorithm may include K-means, K-medoids, Clara, and/or Clarans.

In an embodiment, the center weight selection method of a class is: minimizing the cost function $J(w, w_0)$.

Furthermore, the cost function meets the condition:

$$J(w, w_0) = \sum_{i=1}^{n} (w_i - w_0)^2$$

where w is all the weights of a class, w0 is the center weight of the class, n is the count of weights in the class, wi is the $i^{th}$ weight of the class, and i is an positive integer greater than 0 and less than or equal to n.

Further, the second retraining performed on the neural network after clustering and encoding may include:

performing retraining on the neural network after clustering and encoding by using the back propagation algorithm, where the weights that have been set to 0 in the retraining process remain 0 all the time, and only the weight codebook is retrained, and the weight dictionary is not retrained.

An embodiment of the present disclosure provides a compression device for data of a neural network including:

a memory configured to store an operation instruction; and a processor configured to perform the operation instruction stored in the memory in accordance with the data compression method described in any of the above embodiments.

An embodiment of the present disclosure provides a processing device including:

a coarse-grained selection unit configured to input position information of a neuron and a target weight, and select a neuron to be computed, where the target weight is a weight whose absolute value is greater than a second given threshold;

a lookup table unit configured to receive a quantized target weight dictionary and a quantized target weight codebook, perform a table lookup operation to obtain and output a target weight of a neural network; and an operation unit configured to receive the selected neuron and target weight, perform an operation on the neural network, and output the neuron.

In an embodiment, the lookup table unit may be further configured to transmit an unquantized target weight directly to the operation unit by a bypass.

The processing device may further include an instruction control unit configured to receive and decode the instruction to obtain control information to control the operation unit, and a storage unit configured to store a neuron, a weight and an instruction of the neural network.

In an embodiment, the storage unit may be further configured to store the target weight and position information of the target weight, and store the quantized target weight codebook and the quantized target weight dictionary.

Further, the operation unit may include at least one of the following:

a multiplier configured to multiply first input data and second input data to obtain a product;

an adder tree configured to add third input data through the adder tree step by step, or add the third input data to fourth input data to obtain a sum; and an active function unit configured to perform an active function on fifth data to obtain output data, where the active function may include sigmoid, tan h, relu or softmax.

Further, the operation unit may further include a pooling unit configured to perform a pooling operation on sixth input data to obtain output data, where the pooling operation may include average pooling, maximum pooling, and median pooling.

In an embodiment, the processing device may further include:
an instruction control unit configured to receive and decode the instruction in the storage unit to generate control information, where the instruction control unit controls the coarse-grained selection unit performing a selection operation, controls the lookup table unit performing the table lookup operation, and controls the operation unit performing a computation operation.

Further, the instruction is a neural network dedicated instruction including a control instruction, a data transfer instruction, an operation instruction and a logical instruction.

In an embodiment, the neural network dedicated instruction is a Cambricon instruction set, and each instruction in the Cambircon instruction set has a length of 64 bits, and the instruction may be composed of an operation code and an operand.

Further, the control instruction may be configured to control the execution process of the neural network, and the control instruction may include a jump instruction and a conditional branch instruction.

Further, the data transfer instruction may be configured to transfer data between different storage media, and the data transfer instruction may include a loading instruction, a storage instruction, and a moving instruction.

Further, the operation instruction may be configured to perform a neural network arithmetic operation, and the operation instruction may include a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction.

Further, the logical instruction may be configured to perform a logical operation of the neural network, and the logical instruction may include a vector logical operation instruction and a scalar logical operation instruction.

In an embodiment, the vector logical operation instruction may include a vector comparing operation and a vector logical operation, preferably, the vector comparing operation may include but not be limited to greater than, less than, equal to, greater than or equal to ($\geq$) less than or equal to ($\leq$) and not equal to; and the vector logical operation may include AND, OR, and NOT.

The scalar logical operation may include a scalar comparing operation, a scalar logical operation; preferably, the scalar comparing operation may include but not be limited to, greater than, less than, equal to, greater than or equal to ($\geq$), less than or equal to ($\leq$), and not equal to; the scalar logical operation may include AND, OR, and NOT.

Further, the processing device may further include an instruction caching unit configured to cache the instruction, where the instruction caching unit is an on-chip caching unit.

In an embodiment, the processing device may further include a target weight codebook caching unit configured to cache a target weight codebook, and the target weight codebook caching unit is an on-chip caching unit.

In an embodiment, the processing device may further include a target weight dictionary caching unit configured to cache a target weight dictionary, where the target weight dictionary caching unit is an on-chip caching unit.

In an embodiment, the processing device may further include a target weight position caching unit configured to cache a position of a target weight, and map each connection weight in the input data to the corresponding input neuron, where the target weight position caching unit is an on-chip caching unit.

Further, the target weight position caching unit mapping each connection weight in the input data to the corresponding input neuron may include: 1 indicating that the weight is connected to the input neuron, 0 indicating that the weight is not connected to the input neuron, and a connection status of the input and output of each group forming a string of 0 and 1 to indicate the connection relationship of the output.

Further, the target weight position caching unit mapping each connection weight in the input data to the corresponding input neuron may include: combining a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , and so on, until all the input neurons connected to the output neuron are exhausted, into a connection array of the output.

In an embodiment, the processing device may further include an input neuron caching unit configured to cache an input neuron input to the coarse-grained selection unit, where the input neuron caching unit is an on-chip caching unit.

In an embodiment, the processing device may further include an output neuron caching unit configured to cache an output neuron, where the output neuron caching unit is an on-chip caching unit.

Further, the processing device may further include a DMA unit configured to read/write data or instruction in the storage unit, the instruction caching unit, the target weight codebook caching unit, the target weight dictionary caching unit, the target weight position caching unit, the input neuron caching unit, and the output neuron caching unit.

Further, the processing device may further include a pre-processing unit configured to pre-process original data, and input pre-processed data into the storage unit.

An embodiment of the present disclosure provides a processing method including:
inputting position information of a neuron and a target weight, selecting the neuron that needs to be computed;
receiving a quantized target weight dictionary and a quantized target weight codebook, performing a table lookup operation, and generating and outputting the target weight of the neural network; and
receiving the selected neuron and target weight, performing an operation on the neural network, and generating and outputting the neuron.

In an embodiment, the processing method may include: receiving an unquantized target weight for neural network operation.

In an embodiment, the processing method may further include: receiving and decoding an instruction to generate control information for controlling the operation the neural network.

Further, the operation may include at least one of the following: a multiplication operation multiplying first input data and second input data to obtain a product; an addition operation adding third input data through a adder tree step by step, or adding the third input data to fourth input data to obtain a sum; an active function performing an active function on fifth data to obtain output data, where the active function may include sigmoid, tan h, relu or softmax.

Furthermore, the operation may also include a pooling operation performed on sixth input data to obtain an output data, where the pooling operation may include average pooling, maximum pooling, and median pooling.

Furthermore, the instruction is a neural network dedicated instruction including a control instruction, a data transfer instruction, an operation instruction and a logical instruction.

Further, the control instruction may be configured to control the execution process of the neural network, and the control instruction may include a jump instruction and a conditional branch instruction.

Further, the data transfer instruction may be configured to transfer data between different storage media, and the data transfer instruction may include a loading instruction, a storage instruction, and a moving instruction.

Further, the operation instruction may be configured to perform a neural network arithmetic operation, and the operation instruction may include a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction.

In an embodiment, the neural network dedicated instruction is a Cambricon instruction set, and the instruction may be composed of an operation code and an operand.

Each instruction in the Cambircon instruction set has a fixed length, for example, each instruction in the Cambircon instruction set has a length of 64 bits.

Further, the logical instruction may be configured to perform a logical operation of the neural network, and the logical instruction may include a vector logical operation instruction and a scalar logical operation instruction.

In an embodiment, the vector logical operation instruction may include a vector comparing operation and a vector logical operation, preferably, the vector comparing operation may include but not be limited to greater than, less than, equal to, greater than or equal to ($\geq$) less than or equal to ($\leq$) and not equal to; and the vector logical operation may include AND, OR, and NOT.

The scalar logical operation may include a scalar comparing operation, a scalar logical operation; preferably, the scalar comparing operation may include but not be limited to greater than, less than, equal to, greater than or equal to ($\geq$) less than or equal to ($\leq$) and not equal to; the scalar logical operation may include AND, OR, and NOT.

Further, the processing method may further include a step: pre-processing position information of the input neuron and target weight, where the pre-processing may include segmentation, Gaussian filter, binarization, regularization and/or normalization.

In an embodiment, after receiving the selected neuron and the target weight, the processing method may further include the steps: storing the input neuron, the weight dictionary, the weight codebook and the instruction, and storing the output neuron; and caching the instruction, the input neuron, and the output neuron.

An embodiment of the present disclosure provides an electronic device including a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable device, a vehicle, a household electrical appliance, and/or a medical device.

The vehicles may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

(3) Technical Effects

The compression method and the compression device for neural network provided by the present disclosure have at least one of the following technical effects:

1. Compared with the prior arts, the present disclosure performs coarse-grained pruning and local quantization on the weight of the neural network, which can regularize the sparsification of the neural network, facilitate accelerating by using hardware, and reduce the storage space of the target weight position; local quantization can fully exploit the weight distribution characteristics of the neural network, and reduce the count of bits of each weight, which may thereby further reduce storage overhead and memory access overhead.

2. A neural network processor of the present disclosure is capable of fully exploiting the characteristics of coarse-grained sparsification and local quantization, reducing the memory access and the amount of computation, which may thereby obtain an acceleration ratio and reduce energy consumption; the coarse-grained selection unit can select neurons that need to participate in computation according to the target weight position information, which may reduce the amount of computation; and the lookup table can look up the target weight according to the target weight dictionary and the target weight codebook, which may reduce the memory access.

DETAILED DESCRIPTION OF THE EMBODIMENTS

In order to make the object, technical solution and advantages of the present disclosure more apparent, the present disclosure will be further described in detail below with reference to the drawings in conjunction with specific embodiments thereof.

All units and modules of the present disclosure may be hardware circuits. Physical implementations of the hardware circuits may include but not be limited to physical devices, and the physical devices may include but not be limited to transistors, memristors, DNA computer, and the like.

It should be noted that "first", "second", "third", etc., used in the present disclosure are only used to distinguish different objects, and do not imply that there is any particular sequential relationship between these objects.

The present disclosure provides a method of compressing the neural network, which may include the following steps: performing the coarse-grained pruning and the first retraining, as well as local quantization and the second retraining. Compared with the prior arts, the method can regularize the sparsification of the neural network, facilitate accelerating by using hardware, and reduce the storage space of the target weight position; local quantization can fully exploit the weight distribution characteristics of the neural network, reduce the count of bits of each weight, thereby further reducing storage overhead and memory access overhead.

Figure 1:
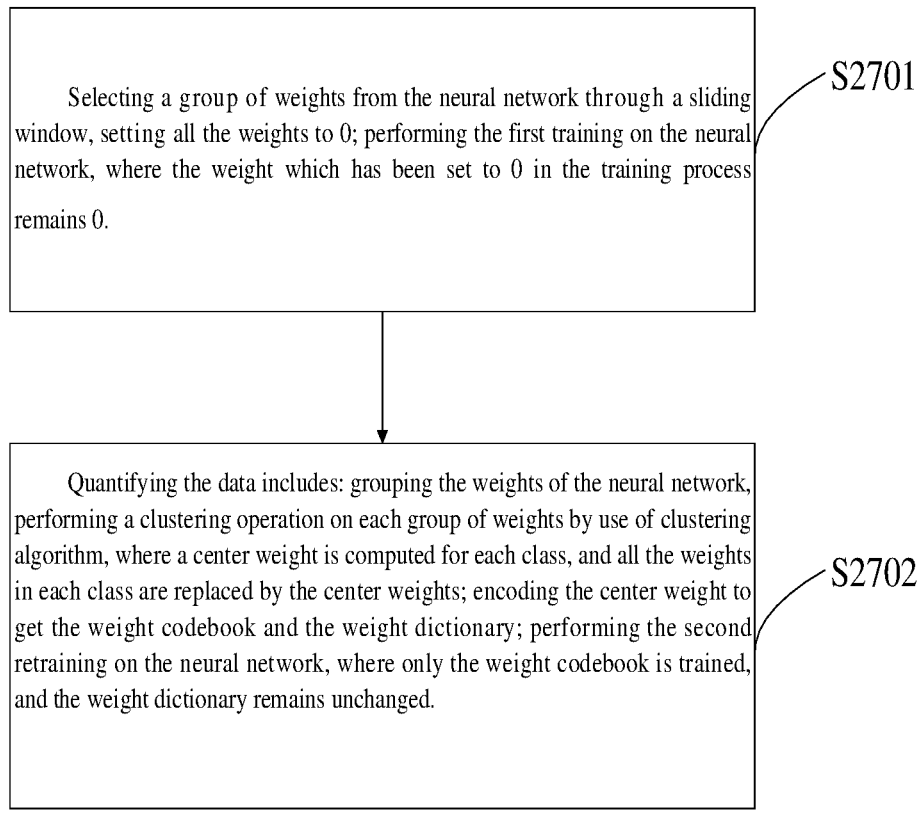
FIG. 1 is a flowchart of a data compression method according to an embodiment of the disclosure.

FIG. 1 is a flowchart of a data compression method according to an embodiment of the disclosure. The data compression method may include the following steps.

In step S2701, selecting M weights from the neural network through a sliding window, where when the M weights meet a preset condition, all or part of the M weights may be set to 0; performing the first retraining on the neural network, where the weight which has been set to 0 in the retraining process remains 0; and in step S2702, grouping the weights of the neural network, clustering and encoding the weights in the groups, and performing the second retraining on the neural network after clustering and encoding.

The step S2701 may be summarized as performing coarse-grained pruning and the first retraining, and specifically include the following steps.

In step S27011, selecting M weights from the retrained neural network through the sliding window.

In step S27012, setting all or part of the M weights to 0 when the M weights meet the preset condition.

The preset condition is:

an information quantity of the M weights meets a preset judgment condition.

In an embodiment, the preset judgment condition may include a threshold judgment condition, where the threshold judgment condition may include one or some condition within or outside a given range of values: less than a given threshold, less than or equal to the given threshold, greater than the given threshold, greater than or equal to the given threshold.

Specifically, the information quantity of the M weights is less than the given threshold, where the information quantity of the M weights may include but not be limited to an arithmetic mean of an absolute value of the M weights, a geometric mean of the absolute value of the M weights or a maximum value of the absolute value of the M weights. The arithmetic mean of the absolute value of the M weights is less than a first threshold; or the geometric mean of the absolute value of the M weights is less than a second threshold; or the maximum value of the absolute value of the M weights is less than a third threshold. The first threshold, the second threshold, and the third threshold may be preset according to a situation, or be obtained by a computation of changing an input parameter in a preset formula, or be obtained by machine learning by those skilled in the art. The present disclosure does not specifically limit the method of obtaining the first threshold, the second threshold and the third threshold.

In an optional embodiment, the preset judgment condition may include a function mapping judgment condition which judges whether the M weights satisfy the given condition after a function transformation.

The weight of the neural network may include the weight in a fully connected layer, the weight in a convolutional layer, and the weight in a LSTM layer.

Figure 2:
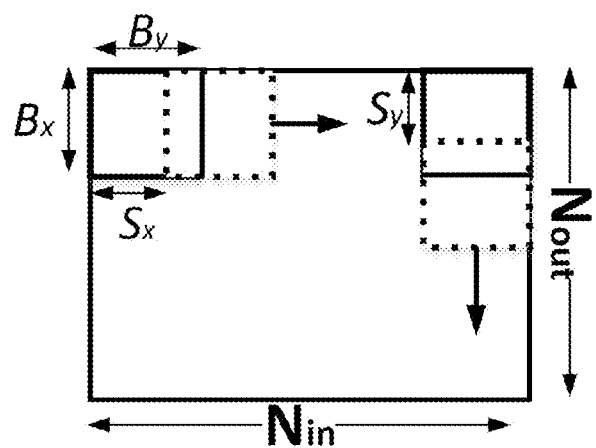
FIG. 2 is a schematic diagram of performing coarse-grained pruning on a fully connected layer of a neural network according to an embodiment of the disclosure.

As shown in FIG. 2, the weights of the fully connected layer may be regarded as a two-dimensional matrix (Nin, Nout), where Nin represents the count of input neurons and Nout represents the count of output neurons, and the fully connected layer has Nin*Nout weights. The size of the sliding window is Bin*Bout, where Bin is a positive integer greater than 0 and less than or equal to Nin, and Bout is a positive integer greater than 0 and less than or equal to Nout. The performing coarse-grained pruning on the weight of the fully connected layer of the neural network may include:

making the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout; and selecting M weights from the Nin*Nout weights through the sliding window, setting all or part of the M weights to 0 when the M weights meet the preset condition, where M=Bin*Bout.

Figure 3:
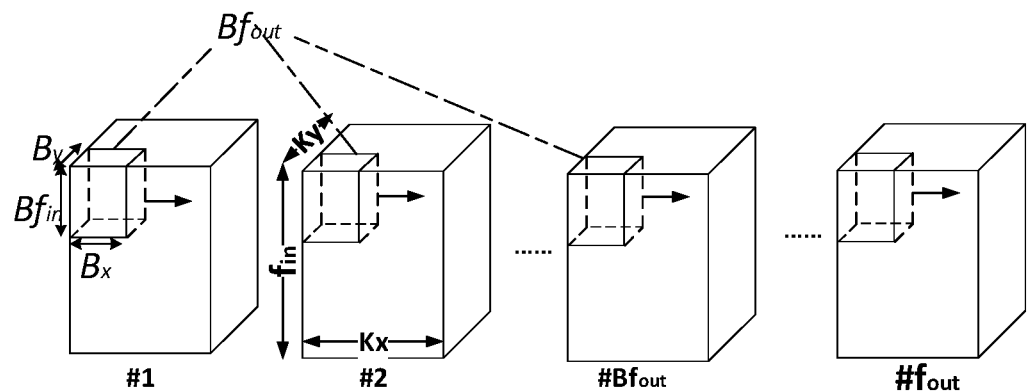
FIG. 3 is a schematic diagram of performing coarse-grained pruning on a convolutional layer of a neural network according to an embodiment of the disclosure.

As shown in FIG. 3, the weight of the convolutional layer may be regarded as a four-dimensional matrix (Nfin, Nfout, Kx, Ky), where Nfin represents the count of input feature maps, and Nfout represents the count of output feature maps, (Kx, Ky) represents the size of the convolution kernel. When the coarse-grained pruning is performed on the weight of the convolutional layer, the sliding window may be determined as a four-dimensional sliding window with the size of Bfin*Bfout*Bx*By, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky. The performing pruning on the weight of the convolutional layer of the neural network may include:

making the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; and selecting M weights from the Nfin*Nfout*Kx*Ky weights through the sliding window, and setting all or part of the M weights to 0 when the M weights meet the preset condition, where M=Bfin*Bfout*Bx*By.

The weights of the LSTM layer of the neural network are composed of a plurality of fully connected layer weights. It is assumed that the weights of the LSTM layer are composed of i weights of the fully connected layer, where i is a positive integer greater than 0. The weight of each fully connected layer is a two-dimensional matrix (Nin_i, Nout_i), where Nin_i represents the count of input neurons of the it weight of the fully connected layer and Nout_i represents the count of output neurons of the weight of the fully connected layer. The size of the sliding window is Bin_i*Bout_i, where Bin_i is a positive integer greater than 0 and less than or equal to Nin_i, and Bout_i is a positive integer greater than 0 and less than or equal to Nout_i. The performing pruning on the weight of the LSTM layer of the neural network may include:

making the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and selecting M weights from the Nin_i*Nout_i weights through the sliding window, setting all or part of the M weights to 0 when the M weights meet the preset condition, where M=Bin_i*Bout_i.

In step S27013, retraining the pruned neural network by the back propagation algorithm, where the weight that has been set to 0 during the training remains 0.

The first retraining: retraining the pruned neural network by the back propagation algorithm, where the weight that has been set to 0 during the training remains 0; continuously repeating coarse-grained pruning and retraining until no weight can be set to 0 without losing a preset precision, where x is a number greater than 0 and less than 100, x may have different choices depending on different neural networks and different disclosures. In an embodiment, the value of x may be 0-5.

The step S2702 may be summarized as performing quantization and retraining, and specifically include the following steps.

In step S27021, grouping the weight of the neural network.

In step S27022, clustering each group of weights adopting the clustering algorithm, dividing a group of weights into m classes, computing the center weight of each class, replacing all the weights of each class by the center weight corresponding to the class, where m is a positive integer greater than 0.

In step S27023, encoding the center weight to obtain the weight codebook and the weight dictionary.

In step S27024, retraining the neural network by the back propagation algorithm, where the weight that has been set to 0 during the training remains 0, and only the weight codebook is trained, while the weight dictionary is not trained.

The grouping the weights of the neural network in step S27021 may include:

grouping the weights of the neural network into one group, and/or;

grouping the weights of the neural network according to the layer-type-based grouping method, and/or;

grouping the weights of the neural network by an inter-layer-based grouping method or an intra-layer-based grouping method.

Figure 4:
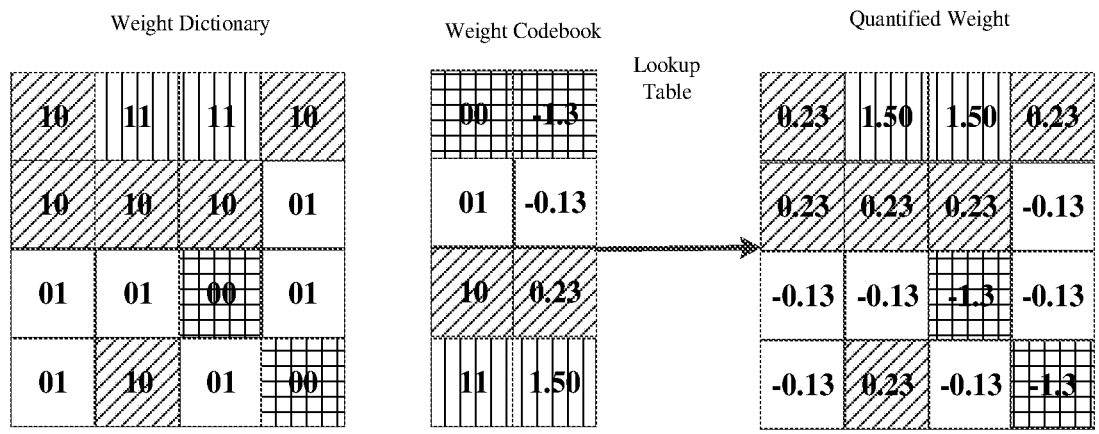
FIG. 4 is a flowchart of a table lookup operation according to an embodiment of the disclosure.

As shown in FIG. 4, the weights are grouped according to the above grouping methods to obtain an ordered matrix of weights. Then, the intra-group sampling and clustering operation are performed on the weight matrix after grouping, so that the weights with similar values are classified into the same class, and the four center weights of 1.50, −0.13, −1.3, and 0.23 are obtained, where the four center weights are corresponding to the weights of four classes. Next, the center weight is encoded, where the class with a center weight of −1.3 is encoded as 00, the class with a center weight of −0.13 is encoded as 01, the class with a center weight of 0.23 is encoded as 10, and the class with a weight of 1.50 is encoded as 11, and 00, 01, 10, 11 are the content of the weight codebook. In addition, the encoding contents (00, 01, 10 and 11) corresponding to the four center weight are respectively represent the weights in the corresponding classes, so as to obtain the weight dictionary.

The quantization process fully exploits the similarity of the inter-layer-based weights and the local similarity of the intra-layer-based weights of the neural network, and obtains the weight distribution characteristics of the neural network to perform low-bit quantization, which may reduce the count of bits representing each weight, and reducing the weight storage overhead and the memory access overhead.

The center weight selection method may be: minimizing the cost function $J(w, w_0)$.

Furthermore, the cost function meets the condition:

$$J(w, w_0) = \sum_{i=1}^{n} (w_i - w_0)^2$$

where w is all the weights of a class, w0 is the center weight of the class, n is the count of weights in the class, wi is the $i^{th}$ weight of the class, and i is an positive integer greater than 0 and less than or equal to n.

Furthermore, the weights of the neural network are grouped according to layer-type-based during local quantization. For example, the weights of all convolutional layers are grouped into one group, and the weights of all the fully connected layers are grouped into one group, and the weights of all LSTM layers are divided into one group.

If a neural network has a total of t different types of layers such as i convolutional layers, j fully connected layers, and m LSTM layers, where i, j, m are integers greater than or equal to 0 and satisfy i+j+m>=1, t is an integer greater than or equal to 1 and satisfies t=i+j+m, and the weight of the neural network will be divided into t groups.

Furthermore, the weights of the neural network are grouped by an inter-layer-based grouping method during local quantization. For example, the one or more successive convolutional layers are grouped into one group, the one or more successive fully connected layers are grouped into one group, and the one or more successive LSTM layers are grouped into one group.

Furthermore, the weights of the neural network are grouped by an intra-layer-based grouping method during local quantization. The quantization on the weights in the convolutional layers, the fully connected layers and the LSTM layers of the neural network are grouped internally.

Specifically, the weights in the convolutional layers of the neural network may be regarded as a four-dimensional matrix (Nfin, Nfout, Kx, Ky), where Nfin, Nfout, Kx, Ky are positive integers, Nfin represents the count of input feature maps, and Nfout represents the count of output feature maps, (Kx, Ky) represents the size of the convolution kernel. The weights of the convolutional layers are grouped into Nfin*Nfout*Kx*Ky/(Mfin*Mfout*Mx*My) different groups according to the group size of (Mfin, Mfout, Mx, My), where Mfin is a positive integer less than or equal to Nfin, Mfout is a positive integer less than or equal to Nfout, Mx is a positive integer less than or equal to Kx, and My is a positive integer less than or equal to Ky.

Furthermore, the weight of the fully connected layer may be regarded as a two-dimensional matrix (Nin,Nout), where Nin and Nout are integers greater than 0, Nin represents the count of input neurons and Nout represents the count of output neurons, and the fully connected layer has Nin*Nout weights. The weights of the fully connected layers are grouped into (Nin*Nout)/(Min*Mout) different groups according to the group size of (Mfin, Mfout), where Min is a positive integer greater than 0 and less than or equal to Nin, and Mout is a positive integer greater than 0 and less than or equal to Nout.

Furthermore, the weights in the LSTM layers of the neural network are regarded as a combination of the weights of a plurality of fully connected layers. It is assumed that the weights of the LSTM layer are composed of the weights of n fully connected layer, n is a positive integer, therefore each fully connected layer can be grouped according to the grouping mode of the fully connected layer.

Figure 5:
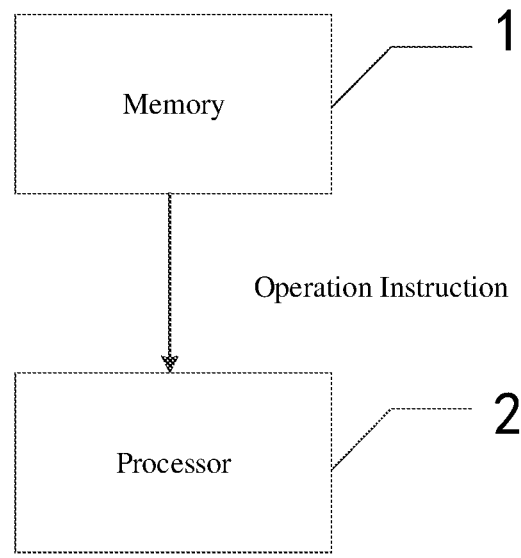
FIG. 5 is a schematic structure diagram of a data quantization device according to an embodiment of the disclosure.

According to another embodiment of the present disclosure, the present disclosure provides a neural network data compression device. FIG. 5 is a schematic structure diagram of a data compression device according to an embodiment of the disclosure. As shown in FIG. 5, the data compression device may include:

a memory 1 configured to store an operation instruction, where the operation instruction is generally a binary number composed of an operation code and an address code, the operation code indicates an operation to be performed by a processor 2, and the address code indicates the address of the memory 1 where the processor 2 reads data participating in the operation;

a processor 2 configured to execute an operation instruction in the memory 1 in accordance with the data quantization method.

By executing the operation instruction in the memory 1 in accordance with the coarse-grained pruning and quantization method, the processor 2 of the compression device may regularly prune the neural network and reduce a parameter of the neural network, quantize the disordered weights to obtain low bit and normalized quantized weight. The data compression device of the present disclosure may fully exploit the similarity of the inter-layer-based weights and the local similarity of the intra-layer-based weights of the neural network, and obtain the weight distribution characteristics of the neural network to perform low-bit quantization, which may reduce the count of bits representing each weight, and reducing the weight storage overhead and the memory access overhead.

Figure 6:
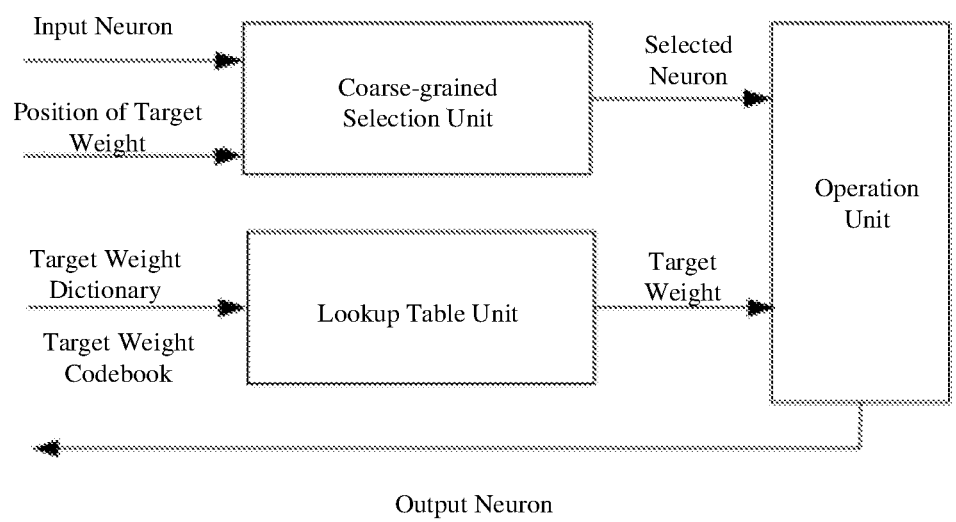
FIG. 6 is a schematic structure diagram of another processing device according to an embodiment of the disclosure.

FIG. 6 is a schematic structure diagram of another processing device according to an embodiment of the disclosure. The present disclosure provides a processing device applied to a neural network processor, so that the neural network processor may fully exploit the characteristics of coarse-grained sparsification and local quantization, reduce the amount of memory access and computation, thereby obtaining an acceleration ratio and reducing energy consumption.

The processing device of the present disclosure may include a coarse-grained selection unit, a lookup table unit and an operation unit.

The coarse-grained selection unit may be configured to receive an input neuron and a position information of a target weight and select a neuron to be computed.

The lookup table unit may be configured to receive a target weight dictionary and a target weight codebook, and perform a table lookup operation to obtain a target weight of the neural network.

The operation unit may be configured to receive the selected neuron and the target weight, complete the neural network operation, and retransmit the output neuron to the storage unit.

Furthermore, the coarse-grained selection unit may be specifically configured to receive the input neuron and the position information of the target weight, and select the neuron corresponding to the target weight (that is, the selected neuron) according to the position information of the target weight and transmit the neuron to the operation unit.

Further, the lookup table unit may be configured to find a quantized target weight based on the weight codebook and the weight dictionary and transmit it to the operation unit. The lookup table unit may be further configured to transmit an unquantized target weight directly to the operation unit by a bypass.

Further, the operations performed by the operation unit may include: the first part multiplies input data 1 and input data 2 to obtain a product; and/or the second part performs an adder tree operation, that is, the second part adds the input data 1 through an adder tree step by step, or adds the input data 1 to the input data 2 to obtain output data; and/or the third part performs an active function, that is, the third part performs the active function on the input data to obtain the output data; and/or the fourth part performs pooling operation, and the process is out=pool(in), where pool represents the pooling operation. The pooling operation may include but not be limited to: mean pooling, maximum pooling, or median pooling. The input data in is the data in a pooling core associated with the output data(out). One or more operations parts may be freely selected in different orders to achieve the operations with various functions.

Specifically, the operation unit may include but not be limited to three parts: a first part is a multiplier, a second part is an adder tree, a third part is an active function unit, and a fourth part is a pooling unit. The first part may multiply the input data 1 (in1) and the input data 2 (in2) to obtain the output data (out), where the process is: out=in1*in2. The second part may add the input data in1 through the adder tree step by step to obtain the output data (out), where in1 is a vector of length N, and N is greater than 1, the process is: out=in1[1]+in1[2]+ . . . +in1[N]; and/or add the input data 1 in1 step by step through the adder tree to obtain a sum, and then add the sum and the input data 2 in2 to obtain the output data(out), the process is: out=in1[1]+in1[2]+ . . . +in1[N]+in2; or add the input data (in1) and the input data (in2) to obtain the output data (out), the process is: out=in1+in2. The third part may perform the active operation on the input data in to obtain the output data(out), the process is out=active (in), where the active operation may include sigmoid, tan h, relu, softmax, and the like; in addition to the active operation, the third part may implement other non-linear functions, that is, the third part perform an operation (f) on the input data (in) to obtain the output data (out), the process is:

out=f(in). The fourth part may perform the pooling operation on the input data (in) to obtain the output data (out), the process is out=pool(in), where pool represents the pooling operation, and the pooling operation may include but not be limited to: mean pooling, maximum pooling, or median pooling. The input data in is the data in a pooling core associated with the output data(out).

Figure 7:
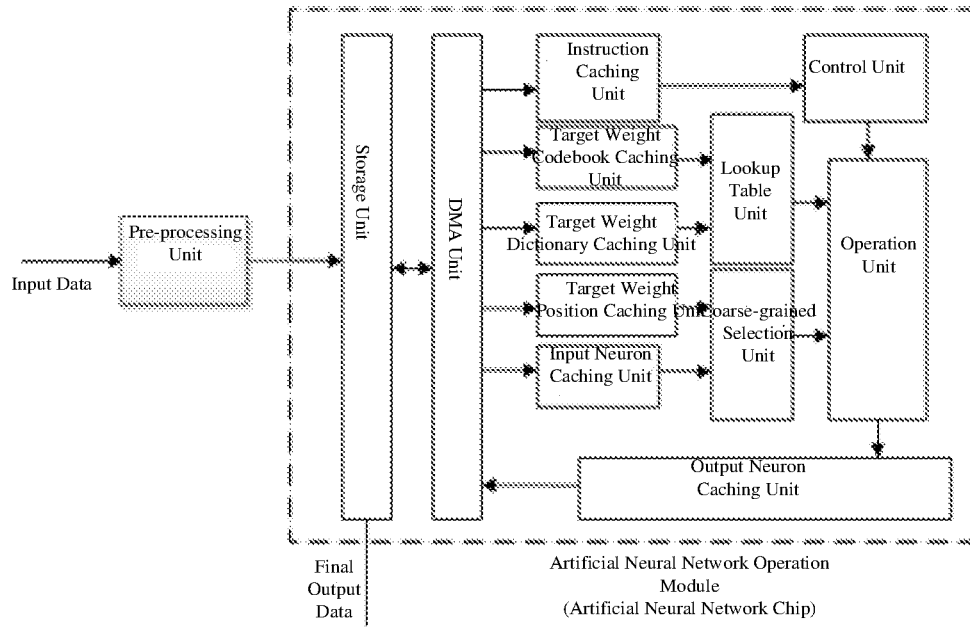
FIG. 7 is a schematic structure diagram of a neural network processor according to an embodiment of the disclosure.

Further, as shown in FIG. 7, the neural network processor may include a pre-processing unit configured to pre-process original data, and the pre-processing operation may include data segmentation, Gaussian filter, binarization, regularization, normalization, and the like.

Further, the processor may include a storage unit configured to store the neuron, weight, and instruction in the neural network.

Further, when the storage unit stores the weight, only the target weight and the position information of the weight are stored. When the storage unit stores the quantized target weight, only the target weight codebook and the target weight dictionary are stored.

The processor may further include an instruction control unit configured to receive the instruction in the storage unit, and decode the instruction to obtain the control information so as to control the coarse-grained selection unit performing selection operation and the operation unit performing computation.

Alternatively, the instruction may be neural network dedicated instruction including all instructions dedicated to completing artificial neural network operations.

The neural network dedicated instruction may include but not be limited to a control instruction, a data transfer instruction, an operation instruction and a logical instruction, where the control instruction may be configured to control the neural network execution process. The data transfer instruction may be configured to transfer data between different storage media, and the data format may include but not be limited to matrix, vector and scalar. The operation instruction may be configured to perform a neural network arithmetic operation, and the operation instruction may include but not be limited to a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction. The logical instruction may be configured to perform a logical operation of the neural network, and the logical instruction may include but not be limited to a vector logical operation instruction and a scalar logical operation instruction.

Specifically, the neural network dedicated instruction may include a Cambricon instruction set.

The Cambricon instruction set is characterized in that each instruction length in the instruction set is a fixed length, for example, the instruction length is 64 bits, and the instruction is composed of an operation code and an operand. The instruction set may include four types of instructions: a control instruction, a data transfer instruction, an operation instruction, and a logical instruction.

The control instruction may be configured to control the execution process, and the control instruction may include a jump instruction and a conditional branch instruction.

The data transfer instruction may be configured to transfer data between different storage media, and the data transfer instruction may include a loading instruction, a storage instruction, and a moving instruction; where the loading instruction may be configured to load data from a main memory to a cache; the storage instruction may be configured to store data from the cache to the main memory; and the moving instruction may be configured to move data from the cache to another cache or from the cache to a register or from the register to another register. The data transfer instruction may support three different ways of organizing data including matrix, vector, and scalar.

The operation instruction may be configured to perform a neural network arithmetic operation, and the operation instruction may include a matrix operation instruction, a vector operation instruction, and a scalar operation instruction.

Further, the matrix operation instruction may be configured to complete a matrix operation in the neural network, and the matrix operation may include a matrix-vector multiplication operation, a vector multiply matrix operation, a matrix multiply scalar operation, an outer product operation, a matrix-add-matrix operation, and a matrix-subtract-matrix operation.

The vector operation instruction may be configured to complete a vector operation in the neural network and the vector operation instruction may include a vector elementary operation, a vector transcendental function operation, a dot product operation, a random vector generation operation, and an operation of maximum/minimum of a vector, where the vector elementary operation may include vector addition, subtraction, multiplication, and division; the vector transcendental function may refer to a function which does not meet any polynomial equation taking polynomials as coefficients including an exponential function, a logarithmic function, a trigonometric function, and an anti-trigonometric function.

The scalar operation instruction may be configured to complete a scalar operation in the neural network, and the scalar operation instruction may include a scalar elementary operation instruction and a scalar transcendental function instruction. The scalar elementary operation may include scalar addition, subtraction, multiplication and division; the scalar transcendental function may refer to a function which does not meet any polynomial equation taking polynomials as coefficients, and the scalar transcendental function may include an exponential function, a logarithmic function, a trigonometric function, and an anti-trigonometric function.

The logical instruction may be configured to complete the neural network logical operation, and the logical instruction may include a vector logical operation instruction and a scalar logical operation instruction.

The vector logical operation instruction may include vector comparing instruction and vector logical operation. The vector comparing operation may include but not be limited to greater than, smaller than, equal to, greater than or equal to ($\geq$) less than or equal to ($\leq$) and unequal to. The vector logical operation may include AND, OR, and NOT.

The scalar logical operation may include a scalar comparing operation and a scalar logical operation. The scalar comparing operation may include greater than, smaller than, equal to, greater than or equal to ($\geq$) less than or equal to ($\leq$) and unequal to. The scalar logical operation may include AND, OR, and NOT.

Furthermore, as shown in FIG. 7, the neural network processor may include a DMA unit.

As shown in FIG. 7, the neural network processor may further include an instruction caching unit, an input neuron caching unit, a target weight codebook caching unit, a target weight dictionary caching unit, a target weight position caching unit, and an output neuron caching unit.

Specifically, the storage unit may be configured to store the neuron, weight, and instruction in the neural network. When the storage unit stores the weight, only the target weight and the position information of the weight are stored. When the storage unit stores the quantized target weight, only the target weight codebook and the target weight dictionary are stored.

The DMA unit may be configured to read/write data or instruction in the storage unit, the instruction caching unit, the target weight codebook caching unit, the target weight dictionary caching unit, the target weight position caching unit, the input neuron caching unit, and the output neuron caching unit.

The instruction caching unit may be configured to store a dedicated instruction.

The target weight codebook caching unit may be configured to cache the target weight codebook.

The target weight dictionary caching unit may be configured to cache the target weight dictionary.

The target weight position caching unit may be configured to cache the position information of the target weight, and map each connection weight in the input data to the corresponding input neuron one-to-one.

In one case, a one-to-one cache method adopted by the target weight position caching unit may be: 1 indicating that the input neuron is connected to the output neuron by the weight, 0 indicating that the input neuron is not connected to the output neuron by the weight, the connection status of all the input neurons and output neuron of each group forming a string of 0 and 1 to indicate the connection relationship of the output neuron. In another case, the one-to-one cache method adopting by the target weight position caching unit may be: 1 indicating that the input neuron is connected to the output neuron by the weight, 0 indicating that the input neuron is not connected to the output neuron by the weight, and the connection status of all the out neurons and input neuron of each group forming a string of 0 and 1 to indicate the connection relationship of the input neuron. In another case, the one-to-one cache method adopted by the target weight position caching unit may be: combining a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , and so on, until all the input of the output are exhausted, to represent the corresponding connection status of the output neuron.

The input neuron caching unit may be configured to cache the input neuron input to the coarse-grained selection unit.

The output neuron caching unit may be configured to cache the output neuron output by the operation unit.

The lookup table unit may be configured to receive the target weight codebook and the target weight dictionary, perform table lookup operation to obtain the target weight. The lookup table unit may be further configured to transmit an unquantized target weight directly to the operation unit by a bypass.

It should be noted that the pre-processing unit, the storage unit, the DMA unit, the coarse-grained pruning unit, the instruction caching unit, the instruction control unit, the target weight caching unit, the target weight position caching unit, the input neuron caching unit, the output neuron caching unit, the coarse-grained selection unit and the operation unit are all physical hardware devices, not functional software units.

The present disclosure further provides a neural network data compression device including a storage device, an instruction decoding device, and a computation device. The storage device stores an instruction sequence of a compressed neural network, which includes a control instruction, a data transfer instruction, a computation instruction, and the like, and controls the computation device to complete the transformation of the neural network format and corresponding format compression task; the instruction decoding device receives the instruction in the storage device, where the instruction is decoded to generate a control signal to control the computation device; the computation device receives the control signal to perform the coarse-grained pruning and quantization operations on the neural network. The computation device may be configured to execute an executable instruction in the storage device in accordance with the data compression method described above.

Figure 8:
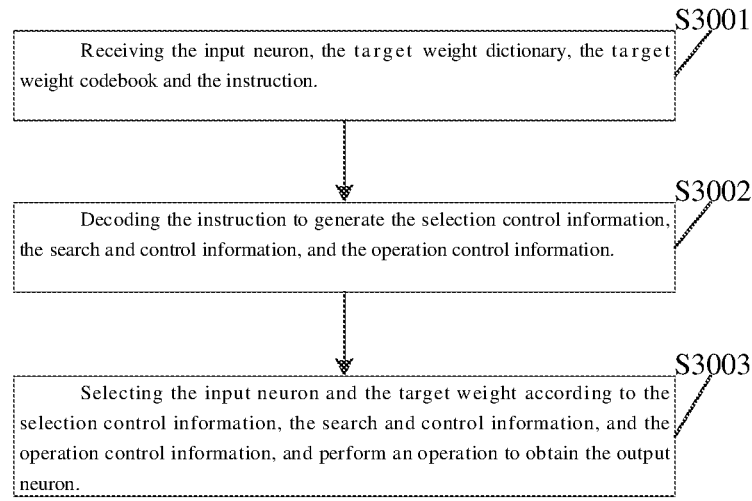
FIG. 8 is a flowchart of a method for processing neural network data according to an embodiment of the disclosure.

The present disclosure also provides a processing method for neural network data, as shown in FIG. 8, the processing method may include the following steps:

in step S3001, receiving the input neuron, the target weight dictionary, the target weight codebook, and instruction, where the target weight is a weight whose absolute value is greater than a given threshold;

in step S3002, decoding the instruction to obtain a selection control information, a search and control information, and an operation control information;

in step S3003, selecting the input neuron and the target weight according to the selection control information, the search and control information, and the operation control information, and computing the input neuron and the target weight to obtain the output neuron.

In some embodiments, the processing method may further include receiving an unquantized target weight for performing the neural network operation.

In some embodiments, the processing method may further include receiving and decoding the instruction to generate the control information to control the operation of the neural network.

In some embodiments, the operation may include at least one of the following: a multiplication operation multiplying first input data and second input data to obtain a product; an addition operation adding third input data through a adder tree step by step, or adding the third input data to fourth input data to obtain a sum; and an active function performing an active function on fifth data to obtain output data, where the active function may include sigmoid, tan h, relu, or softmax.

Furthermore, the operation may also include a pooling operation performed on sixth input data to obtain an output data, where the pooling operation may include average pooling, maximum pooling, and median pooling.

Furthermore, the instruction is a neural network dedicated instruction including a control instruction, a data transfer instruction, an operation instruction, and a logical instruction.

Further, the control instruction may be configured to control the execution process of the neural network, and the control instruction may include a jump instruction and a conditional branch instruction.

Further, the data transfer instruction may be configured to transfer data between different storage media, and the data transfer instruction may include a loading instruction, a storage instruction, and a moving instruction.

In some embodiments, the operation instruction may be configured to perform a neural network arithmetic operation, and the operation instruction may include a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction.

Where, the RBM neural network operation instruction may be configured to implement an RBM neural network operation.

The LRN neural network operation instruction may be configured to implement an LRN neural network operation.

The LCN neural network operation instruction may be configured to implement an LCN neural network operation.

The LSTM neural network operation instruction may be configured to implement an LSTM neural network operation.

The RNN neural network operation instruction may be configured to implement an RNN neural network operation.

The RELU neural network operation instruction may be configured to implement an RELU neural network operation.

The PRELU neural network operation instruction may be configured to implement a PRELU neural network operation.

The SIGMOID neural network operation instruction may be configured to implement a SIGMOID neural network operation.

The TAN H neural network operation instruction may be configured to implement a TAN H neural network operation.

The MAXOUT neural network operation instruction may be configured to implement a MAXOUT neural network operation.

In an embodiment, the neural network dedicated instruction is a Cambricon instruction set. Each instruction in the Cambircon instruction set has a fixed length, for example, each instruction in the Cambircon instruction set has a length of 64 bits, and the instruction may be composed of an operation code and an operand.

In some embodiments, the logical instruction may be configured to perform the logical operation of the neural network, and the logical instruction may include a vector logical operation instruction and a scalar logical operation instruction.

In an embodiment, the vector logical operation instruction may include a vector comparing operation and a vector logical operation, preferably, the vector comparing operation may include but not be limited to greater than, less than, equal to, greater than or equal to ($\geq$) less than or equal to ($\leq$) and not equal to; and the vector logical operation may include AND, OR, and NOT.

The scalar logical operation may include a scalar comparing operation, a scalar logical operation; preferably, the scalar comparing operation may include but not be limited to greater than, less than, equal to, greater than or equal to ($\geq$) less than or equal to ($\leq$) and not equal to; the scalar logical operation may include AND, OR, and NOT.

In some embodiments, the processing method may further include pre-processing the input neuron and the position information of the target weight, where the pre-processing may include segmentation, Gaussian filter, binarization, regularization, and/or normalization.

In some embodiments, after receiving the selected neuron and the target weight, the processing method may further include the steps: storing the input neuron, the weight dictionary, the weight codebook and the instruction, and storing the output neuron; and caching the instruction, the input neuron, and the output neuron.

In some embodiments, the present disclosure provides a chip, which may include the neural network processor.

In some embodiments, the present disclosure provides a chip package structure, which may include the chip.

In some embodiments, the present disclosure provides a board card, which may include the chip package structure.

In some embodiments, the present disclosure provides an electronic device, which may include the board card.

The electronic device may include a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable device, a vehicle, a household electrical appliance, and/or a medical device.

The vehicles may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

All of the modules in the embodiment of the disclosure may be hardware structures. Physical implementation of the hardware structures may include but not be limited to physical device, and the physical device may include but not be limited to transistors, memristors, and Deoxyribonucleic Acid (DNA) computers.

With the data compression method and processing method of the present disclosure, the neural network can be compressed regularly with a high compression ratio. The accelerating device may implement a compression method to achieve compression of the neural network. The accelerating device can fully exploit the characteristics of the compressed neural network, reduce the memory and the amount of computation, thereby obtaining an acceleration and reducing the energy consumption.

Those skilled in the art should understand that the modules in the devices of the embodiment may be adaptively changed and placed in one or more different devices of the embodiment. The modules or units or components of the embodiment may be combined into one module or unit or component, and may be divided into a plurality of sub-modules or sub-units or sub-components. In addition to the above characteristics and/or process or that at least some of units are mutually exclusive, all of the characteristics, processes or units of any method or device disclosed in this specification (including accompanying claims, abstracts and drawings) may be combined in any manner. Unless there are clear statements, each feature disclosed in this specification (including accompanying claims, abstracts and drawings) can be replaced by an alternative feature of the same, equivalent or similar purpose.

The purposes, technical solutions, and beneficial effects of the present disclosure are further described above with the specific embodiments in detail. It is to be understood that the above is only the specific embodiment of the disclosure and not intended to limit the disclosure. Any modifications, equivalent replacements, improvements, and the like made within the spirit and principle of the disclosure shall fall within the scope of protection of the disclosure.

What is claimed is:

1. A data compression method, comprising: performing coarse-grained pruning on weights of a neural network, which includes: selecting one or more weights of the weights from the neural network through a sliding window, and setting all or part of the one or more weights to 0 when the one or more weights meet a preset condition, wherein the preset condition is a condition in which information quantity of the one or more weights is less than a first given threshold, and the information quantity is an arithmetic mean of an absolute value of the one or more weights, a geometric mean of the absolute value of the one or more weights, or a maximum value of the one or more weights; performing a first retraining on the neural network, where the one or more weights which have been set to 0 remain 0 in the first retraining; repeating selecting the one or more weights from the neural network through the sliding window; setting all or part of the one or more weights to 0 when the one or more weights meet the preset condition; and performing the first retraining on the neural network until no weight of the one or more weights is set to 0 without losing a preset precision; quantizing the weights of the neural network, which includes: grouping the weights of the neural network, performing a clustering operation on each group of the weights by using a clustering algorithm to generate multiple classes of the weights, computing a center weight of each class of the multiple classes, and replacing all the weights in each class of the multiple classes by the center weights; encoding the center weights and center weights codes to generate a weight codebook, wherein the weight codebook includes the center weights, the center weights codes, and a correspondence between the center weights and the respective center weight codes; and encoding the center weight codes to generate a weight dictionary.

2. The data compression method of claim 1, wherein, after the encoding of the center weights, the method further includes:
performing a second retraining on the neural network, wherein,
only the weight codebook is trained during the second retraining of the neural network, and
the weight dictionary remains unchanged.

3. The data compression method of claim 1, wherein
the first given threshold is a first threshold, a second threshold, or a third threshold; and
the information quantity of the one or more weights being less than the first given threshold includes:
the arithmetic mean of the absolute value of the one or more weights being less than the first threshold, or the geometric mean of the absolute value of the one or more weights being less than the second threshold, or the maximum value of the one or more weights being less than the third threshold.

4. The data compression method of claim 1, wherein performing the coarse-grained pruning on the weights of a fully connected layer of the neural network includes: setting the weights of the fully connected layer being a two-dimensional matrix (Nin, Nout), where Nin represents a count of input neurons and Nout represents a count of output neurons, and the fully connected layer has Nin*Nout weights; setting a size of the sliding window being Bin*Bout, where Bin is a positive integer greater than 0 and less than or equal to Nin, and Bout is a positive integer greater than 0 and less than or equal to Nout; making the sliding window slide Sin stride in a direction of Bin, or slide Sout stride in a direction of Bout, where Sin is a positive integer greater than 0 and less than or equal to Bin, and Sout is a positive integer greater than 0 and less than or equal to Bout; and selecting the one or more weights from Nin*Nout weights through the sliding window, and when the one or more weights meet the preset condition, all or part of the one or more weights are set to 0, where M=Bin*Bout.

5. The data compression method of claim 1, wherein performing the coarse-grained pruning on the weights of a convolutional layer of the neural network includes: setting the weights of the convolutional layer of the neural network being a four-dimensional matrix (Nfin, Nfout, Kx, Ky), where Nfin represents a count of input feature maps, Nfout represents a count of output feature maps, (Kx, Ky) is a size of a convolution kernel, and the convolutional layer has Nfin*Nfout*Kx*Ky weights; setting the sliding window being a four-dimensional sliding window with a size of Bfin*Bfout*Bx*By, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky; making the sliding window slide Sfin stride in a direction of Bfin, or slide Sfout stride in a direction of Bfout, or slide S stride in a direction of Bx, or slide Sy stride in a direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; and selecting the one or more weights from Nfin*Nfout*Kx*Ky weights through the sliding window, and when the one or more weights meet the preset condition, all or part of the one or more weights are set to 0, where M=Bfin*Bfout*Bx*By.

6. The data compression method of claim 1, wherein performing the coarse-grained pruning on the weights of a LSTM layer of the neural network includes: setting the weights of the LSTM layer being composed of a plurality weights of a fully connected layer, and an $i^{th}$ weight of the fully connected layer is a two-dimensional matrix (Nin_i, Nout_1), where 1 is a positive integer greater than 0 and less than or equal to m, Nin_i represents a count of input neurons of the i weight of the fully connected layer, and Nout_i represents a count of output neurons of the i weight of the fully connected layer; setting a size of the sliding window being Bin_i*Bout_1, where Bin_1 is a positive integer greater than 0 and less than or equal to Nin_i, and Bout_i is a positive integer greater than 0 and less than or equal to Nout_1; making the sliding window slide Sin_i stride in a direction of Bin_1, or slide Sout_1 stride in a direction of Bout_i1, where Sin_1 is a positive integer greater than 0 and less than or equal to Bin i, and Sout_i is a positive integer greater than 0 and less than or equal to Bout_i; and selecting one or more weights from Bin i*Bout_i weights through the sliding window, and when the one or more weights meet the preset condition, all or part of the one or more weights are set to 0, where M=Bin_i*Bout_1.

7. The data compression method of claim 1, wherein the first retraining adopts a back propagation algorithm, and the one or more weights which have been set to 0 remain 0 in the first retraining.

8. The data compression method of claim 1,
wherein the grouping of the weights of the neural network includes grouping into a group, layer-type-based grouping, inter-layer-based grouping, and/or intra-layer-based grouping,
wherein the grouping into a group includes grouping all the weights of the neural network into a group,
grouping the weights of the neural network according to the layer-type-based grouping method includes:
grouping the weights of all convolutional layers, the weights of all fully connected layers, and the weights of all LSTM layers in the neural network into one group respectively,
wherein the grouping of the weights of the neural network by the inter-layer-based grouping method includes:
grouping the weights of one or a plurality of convolutional layers, one or a plurality of fully connected layers and one or a plurality of LSTM layers in the neural network into one group respectively,
wherein the grouping of the weights of the neural network by the intra-layer-based grouping method includes:
segmenting the weights in one layer of the neural network, where each segmented part forms a group.

9. The data compression method of claim 1, wherein the clustering algorithm includes K-means, K-medoids, Clara, and/or Clarans.

10. The data compression method of claim 1, wherein a center weight selection method of a class is: minimizing a cost function $J(w,w_0)$.

11. The data compression method of claim 10, wherein the cost function meets a condition:

$$J(w, w_0) = \sum_{i=1}^{n} (w_i - w_0)^2$$

where w is all weights of a class, w0 is a center weight of the class, n is a count of weights in the class, wi is an $i^{th}$ weight of the class, and i is a positive integer greater than 0 and less than or equal to n.

12. The data compression method of claim 2, wherein the second retraining performed on the neural network after the clustering and the encoding includes:
performing the second retraining on the neural network after the clustering, and the encoding by using a back propagation algorithm, where the one or more weights that have been set to 0 in the second retraining remains 0 all time, and only the weight codebook is retrained, the weight dictionary is not retrained.

13. A data compression device, comprising: a memory configured to store an operation instruction; and a processor configured to: perform coarse-grained pruning on weights of a neural network, which includes: select one or more weights of the weights from the neural network through a sliding window, and set all or part of the one or more weights to 0 when the one or more weights meet a preset condition, wherein the preset condition is a condition in which information quantity of the one or more weights is less than a first given threshold, and the information quantity is an arithmetic mean of an absolute value of the one or more weights, a geometric mean of the absolute value of the one or more weights, or a maximum value of the one or more weights; perform a first retraining on the neural network, where the one or more weights which have been set to 0 remain 0 in the first retraining; repeat selection of the one or more weights from the neural network through the sliding window; set all or part of the one or more weights to 0 when the one or more weights meet the preset condition; and perform the first retraining on the neural network until no weight of the one or more weights is set to 0 without losing a preset precision; quantize the weights of the neural network, wherein the processor is further configured to: group the weights of the neural network, perform a clustering operation on each group of the weights by using a clustering algorithm to generate multiple classes of the weights, compute a center weight of each class of the multiple classes, and replace all the weights in each class of the multiple classes by the center weights; encode the center weights and center weights codes to generate a weight codebook, wherein the weight codebook includes the center weights, the center weights codes, and a correspondence between the center weights and the respective center weight codes; and encode the center weight codes to generate a weight dictionary.

14. The data compression device of claim 13, the processor is further configured to perform a second retraining on the neural network, wherein, only the weight codebook is trained during the second retraining of the neural network, and the weight dictionary remains unchanged.

15. The data compression device of claim 13, wherein
the first given threshold is a first threshold, a second threshold, or a third threshold; and
the information quantity of the one or more weights being less than the first given threshold includes:
the arithmetic mean of the absolute value of the one or more weights being less than the first threshold, or the geometric mean of the absolute value of the one or more weights being less than the second threshold, or the maximum value of the one or more weights being less than the third threshold.

16. An electronic device, comprising: a data compression device that includes: a memory configured to store an operation instruction; and a processor configured to: perform coarse-grained pruning on weights of a neural network, which includes: select one or more weights of the weights from the neural network through a sliding window, and set all or part of the one or more weights to 0 when the one or more weights meet a preset condition, wherein the preset condition is a condition in which information quantity of the one or more weights is less than a first given threshold, and the information quantity is an arithmetic mean of an absolute value of the one or more weights, a geometric mean of the absolute value of the one or more weights, or a maximum value of the one or more weights; perform a first retraining on the neural network, where the one or more weights which have been set to 0 remains 0 in the first retraining; repeat selection of the one or more weights from the neural network through the sliding window; set all or part of the one or more weights to 0 when the one or more weights meet the preset condition; and perform the first retraining on the neural network until no weight of the one or more weights is set to 0 without losing a preset precision; quantize the weights of the neural network, wherein the processor is further configured to: group the weights of the neural network, perform a clustering operation on each group of the weights by using a clustering algorithm to generate multiple classes of the weights, compute a center weight of each class of the multiple classes, and replace all the weights in each class of the multiple classes by the center weights; encode the center weights and center weights codes to generate a weight codebook, wherein the weight codebook includes the center weights, the center weights codes, and a correspondence between the center weights and the respective center weight codes; and encode the center weight codes to generate a weight dictionary.

* * * * *